(12) United States Patent
Jang

(10) Patent No.: US 10,708,176 B2
(45) Date of Patent: Jul. 7, 2020

(54) NETWORK DEVICE AND OPERATION METHOD FOR NETWORK DEVICE

(71) Applicant: SK TELECOM CO., LTD., Seoul (KR)

(72) Inventor: Jae Seong Jang, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1 day.

(21) Appl. No.: 16/173,456

(22) Filed: Oct. 29, 2018

(65) Prior Publication Data

US 2019/0068488 A1 Feb. 28, 2019

Related U.S. Application Data

(63) Continuation of application No. PCT/KR2017/006984, filed on Jun. 30, 2017.

(30) Foreign Application Priority Data

Sep. 29, 2016 (KR) .................. 10-2016-0125305
Oct. 5, 2016 (KR) .................. 10-2016-0128513

(51) Int. Cl.
  *H04L 12/725* (2013.01)
  *H04W 88/18* (2009.01)
  (Continued)

(52) U.S. Cl.
  CPC .......... *H04L 45/306* (2013.01); *H04L 5/0053* (2013.01); *H04L 5/0055* (2013.01);
  (Continued)

(58) Field of Classification Search
  CPC ..... H04L 45/306; H04L 45/42; H04L 5/0053; H04L 5/0055; H04L 41/12; H04L 63/0807; H04W 40/02; H04W 88/184; H04W 8/18
  See application file for complete search history.

(56) References Cited

U.S. PATENT DOCUMENTS 10,419,931 B1 * 9/2019 Sohail ................. H04L 63/1425
10,470,100 B2 * 11/2019 Qiao ..................... H04L 69/323
(Continued)

FOREIGN PATENT DOCUMENTS

JP          5953169 B2      7/2016
KR   10-2011-0025664 A      3/2011
(Continued)

OTHER PUBLICATIONS

Arias et al "Privacy and Security in Internet of Things and Wearable Devices," IEEE Transactions on Multi-Scale Computing Systems, vol. 1, No. 2, Apr.-Jun. 2015, pp. 99-109. (Year: 2015).*
(Continued)

*Primary Examiner* — Afsar M Qureshi
(74) *Attorney, Agent, or Firm* — Hauptman Ham, LLP

(57) ABSTRACT

A network device in a network system including a plurality of network devices, includes: an identification unit to identify whether specific information is included in an uplink message received from a specific terminal device, where the specific information includes subscription-related information indicating that the specific terminal device has a subscription to a specific network device among the plurality of network devices and the specific terminal device is locally managed by the specific network device; a determination unit to determine whether to route the uplink message on the basis of the identification of the specific information; and a decision unit to decide the specific network device to which the uplink message is routed on the basis of the specific information when routing the uplink message is determined, where each network device of the network devices in the network system locally manages terminal devices which subscribes to each network device.

15 Claims, 12 Drawing Sheets

(51) Int. Cl.
  *H04L 12/24*    (2006.01)
  *H04L 12/717*   (2013.01)
  *H04W 40/02*    (2009.01)
  *H04L 5/00*     (2006.01)
  *H04L 29/06*    (2006.01)
  *H04W 8/18*     (2009.01)

(52) U.S. Cl.
  CPC ............ *H04L 41/12* (2013.01); *H04L 45/302* (2013.01); *H04L 45/42* (2013.01); *H04W 40/02* (2013.01); *H04W 88/184* (2013.01); *H04L 63/0807* (2013.01); *H04W 8/18* (2013.01)

(56) References Cited

U.S. PATENT DOCUMENTS

| | | | |
|---|---|---|---|
| 2016/0050601 A1* | 2/2016 | Jeong | H04W 36/14 455/436 |
| 2018/0234395 A1* | 8/2018 | Jalkanen | H04L 12/4641 |
| 2019/0141566 A1* | 5/2019 | Hong | H04W 28/04 |
| 2019/0349426 A1* | 11/2019 | Smith | H04W 4/08 |

FOREIGN PATENT DOCUMENTS

| | | |
|---|---|---|
| KR | 10-1278722 B1 | 6/2013 |
| KR | 10-2015-0065713 A | 6/2015 |
| KR | 10-2016-0105034 A | 9/2016 |
| KR | 10-20160105034 * | 9/2016 |

OTHER PUBLICATIONS cisco.com, "Internet of Things (IoT)," http://www.cisco.com/c/en/us/solutions/internet-of-thing/iot-products.htm- 1, May 4, 2016, 2 pages. (Year: 2016).*

ISO/IEC JTC 1, "Internet of Things (IoT)," Preliminary Report, 2014, 17 pages. (Year: 2014).*

IEEE Standards Association, "P2413—Standard for an Architectural Framework for the Internet of Things (IoT)," https://standards.ieee.org/develpo/project/2413.html, May 4, 2016, 1 page. (Year: 2016).*

International Search Report for PCT/KR2017/006984 dated Oct. 24, 2017.

* cited by examiner

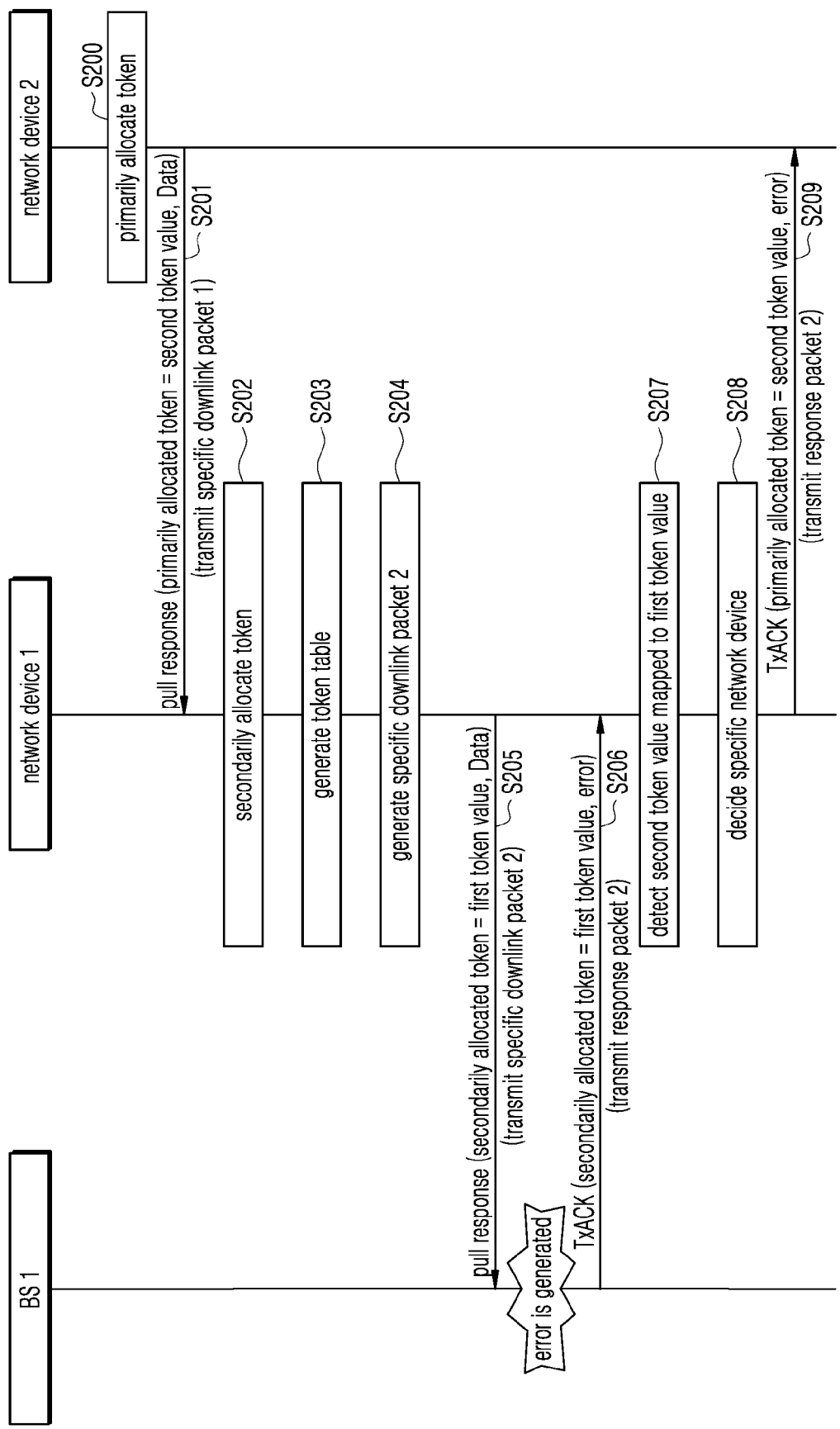

NETWORK DEVICE AND OPERATION METHOD FOR NETWORK DEVICE

CROSS-REFERENCE TO RELATED APPLICATIONS

The present application is a continuation of International Application No. PCT/KR2017/006984 filed on Jun. 30, 2017, which is based on, and claims priorities from, Korean Patent Application No. 10-2016-0125305, filed on Sep. 29, 2016, and Korean Patent Application No. 10-2016-0128513, filed on Oct. 5, 2016. The disclosures of the above-listed applications are hereby incorporated by reference herein in their entirety.

FIELD

The present disclosure relates to an Internet of Things (IoT) technology. More particularly, the present disclosure relates to a technology for improving performance of an IoT service by implementing a call processing scheme which is suitable for an IoT network and support mobility of an IoT terminal.

BACKGROUND

The statements in this section merely provide background information related to the present disclosure and do not constitute prior art.

Internet of Things (IoT) technology for sharing information through wired/wireless network connection between general objects has appeared and has been spotlighted in various fields such as health care, remote meter reading, smart homes, smart cars, and smart farms.

An IoT network structure for providing an IoT service based on the IoT technology will be briefly described below.

The IoT network consists of a remote IoT terminal, a customer terminal configured to have an application for IoT (hereinafter, referred to as an IoT app) installed therein to identify data of the remote IoT terminal control the IoT terminal, a network device (or an IoT app server) configured to connect the IoT terminal and the customer terminal (IoT app) through a wired/wireless network, and a gateway (for example, a Base Station (BS)) configured to transmit/receive packets between the IoT terminal and the network device.

In the IoT network, a method of supporting mobility of the IoT terminal has not been presented since it is only considered that the number of network devices is one.

Further, since there is no server for managing subscription/opening of the IoT terminal in the current network, each network device locally manages subscription-related information if two or more network devices exist.

When the IoT terminal moves to a BS of another network device, which is not the network device managing its own subscription-related information, a call processing process cannot be performed and thus the call processing fails.

Further, when the IoT terminal moves to a boundary area between BSs connected to different network devices, the different network devices overlappingly process the call of the IoT terminal, so that the resource efficiency is inevitably reduced.

Meanwhile, the IoT network includes a plurality of IoT terminals. If the plurality of IoT terminals simultaneously moves to one network, the one network is overloaded, so that trouble-free IoT services cannot be provided Accordingly, the present disclosure proposes a routing method between networks for supporting mobility of the IoT terminal to implement a call processing method suitable for the IoT network.

SUMMARY

An aspect of the present disclosure is to support mobility of the IoT terminal to implement a call processing method suitable for the IoT network.

In accordance with an aspect of the present disclosure, a network device is provided. The network device includes: an identification unit, implemented by a processor and including electrical circuits or integrated circuits, configured to identify whether specific information is included in an uplink message received from a specific terminal device, where the specific information includes subscription-related information indicating that (i) the specific terminal device has a subscription to a specific network device among the plurality of network devices and (ii) the specific terminal device is locally managed by the specific network device; a determination unit, implemented by a processor and including electrical circuits or integrated circuits, configured to determine whether to route the uplink message on the basis of the identification of the specific information; and a decision unit, implemented by a processor including electrical circuits or integrated circuits, configured to decide the specific network device to which the uplink message is routed on the basis of the specific information when routing the uplink message is determined. Herein, each network device of the network devices in the network system locally manages terminal devices which subscribes to each network device.

In accordance with another aspect of the present disclosure, the method operating a network device in a network system including a plurality of network devices, comprises: identifying whether specific information is included in an uplink message received from a specific terminal device, wherein the specific information includes subscription-related information indicating that (i) the specific terminal device has a subscription to a specific network device among the plurality of network devices and (ii) the specific terminal device is locally managed by the specific network device; determining whether to route the uplink message on the basis of the identification of the specific information; and deciding the specific network device to which the uplink message is routed on the basis of the specific information when routing the uplink message is determined. Herein each network device of the network devices in the network system locally manages terminal devices which subscribes to each network device.

In accordance with another aspect of the present disclosure, a network device is provided. The network device includes: a receiver, implemented by a processor and including electrical circuits or integrated circuits, configured to receive a response packet of a specific downlink packet transmitted to a terminal device; a decision unit, implemented by a processor and including electrical circuits or integrated circuits, configured to analyze whether the response packet indicates the specific downlink packet is generated by a specific network device among the plurality of network devices in the network system; a routing unit, implemented by a processor and including electrical circuits or integrated circuits, configured to route the response packet to the specific network device when the specific network device is a network device other than the network device receiving the response packet.

In accordance with another aspect of the present disclosure, a method of operating a network device in a network system including a plurality of network devices is provided. The method includes: receiving a response packet of a specific downlink packet transmitted to a terminal device; analyzing whether the response packet indicates the specific downlink packet is generated by a specific network device among the plurality of network devices in the network system; and routing the response packet to the specific network device when the specific network device is a network device other than the network device receiving the response packet.

BRIEF DESCRIPTION OF THE DRAWINGS

The above and other aspects, features and advantages of the present disclosure will be more apparent from the following detailed description taken in conjunction with the accompanying drawings, in which:

FIG. 12 is a flowchart illustrating the operation in which the network device routes a response packet (TxACK) according to another embodiment of the present disclosure.

DETAILED DESCRIPTION

Figure 1:
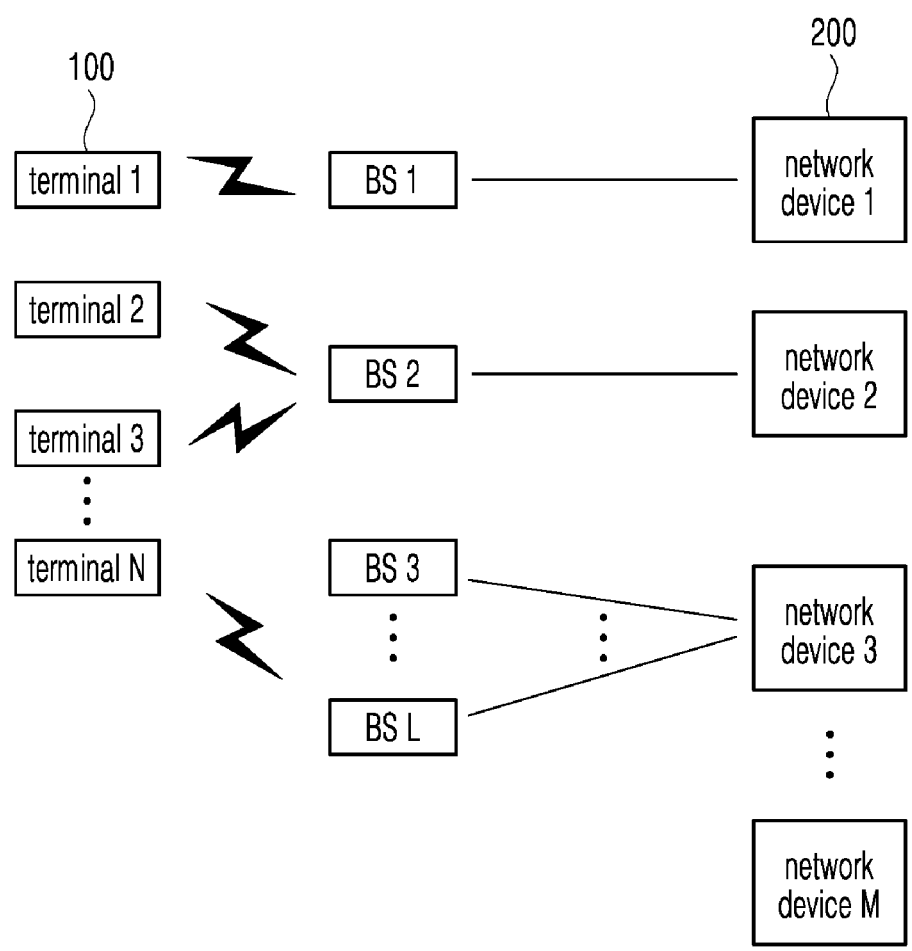
FIG. 1 illustrates an IoT network structure to which the present disclosure is applied.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, embodiments of the present disclosure will be described with reference to the accompanying drawings.

FIG. 1 illustrates a structure of an Internet of Things (IoT) network to which the present disclosure is applied.

The structure of the IoT network consists of remote IoT terminals 100 (for example, terminals 1, 2, . . . N), a customer terminal (not shown) configured to have an IoT app installed therein to control the IoT terminals and remotely identify data of the IoT terminals, network devices 200 (IoT app servers) (for example, network devices 1, 2, 3, . . . M) configured to connect the IoT terminals and the customer terminal (IoT app) through a wired/wireless network, and gateways (for example, BSs 1, 2, . . . L) configured to transmit/receive messages between the IoT terminal 100 and the network device 200.

In the structure of the IoT network, since there is no server designated for managing subscription/opening of the IoT terminals, the network device individually manages subscription-related information of the IoT terminals.

That is, although two or more network devices exist in the structure of the IoT network, there is a limitation on supporting mobility of the IoT terminals like in the case where the number of network devices is one, since the network devices locally manage subscription-related information of the IoT terminals.

Hereinafter, a situation in which mobility of the IoT terminal is not supported in the structure of the IoT network in which there are two or more network devices will be described with reference to FIG. 2.

Figure 2:
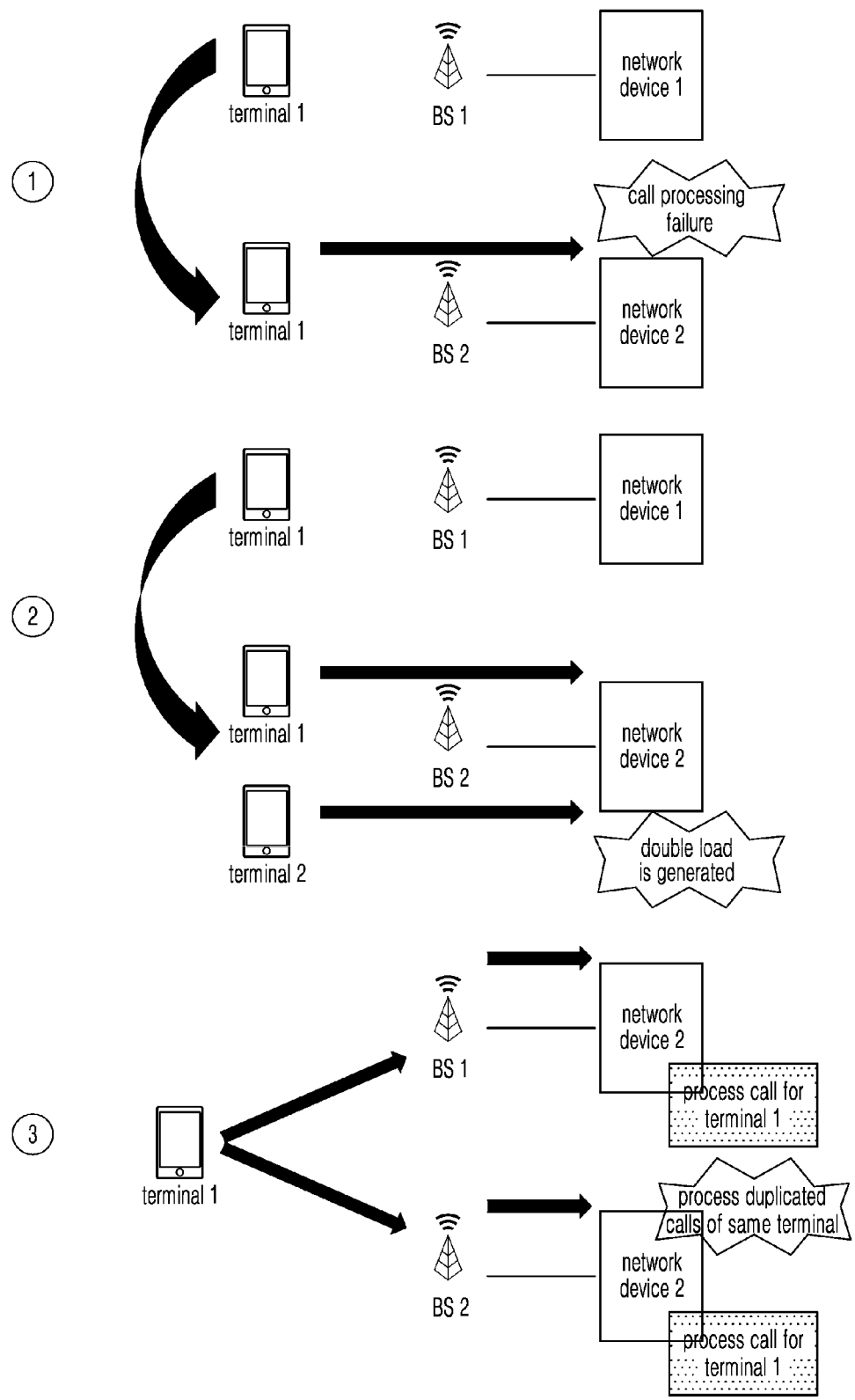
FIG. 2 illustrates a situation in which mobility of the existing IoT terminal is not supported.

It is assumed that network device 1 manages subscription-related information of terminal 1 and network device 2 manages subscription-related information of terminal 2 in FIG. 2.

In ① of FIG. 2, terminal 1 moves to BS 2 connected to network device 2.

In this case, network device 2 receives a request for processing a call by receiving an uplink packet (an uplink message) from terminal 1. However, network device 2 fails to perform a call processing process since network 1 cannot identify subscription-related information of terminal 1.

That is, only network 1 manages the subscription-related information of terminal 1. Accordingly, when terminal 1 moves to network device 2 and makes a request for call processing, the call processing fails.

In ② of FIG. 2, when terminal 1 moves to BS 2 connected to network device 2 and transmits an uplink packet (an uplink message), network device 2 is overloaded due to simultaneous access of a plurality of terminals and thus network device 2 may not perform call processing nor other functions of the IoT service.

In ③ of FIG. 2, terminal 1 moves to a boundary area between BS 1 connected to network device 1 and BS 2 connected to network device 2.

In this case, all of network devices 1 and 2 receive a request for call processing by receiving an uplink message from terminal 1.

At this time, network device 1 performs the call processing for the uplink message on the basis of subscription-related information of terminal 1. However, network device 2 cannot identify the subscription-related information of terminal 1 and thus cannot succeed in call processing, but may perform a process of attempting the corresponding procedure according to the request for call processing.

As a result, when terminal 1 moves to the boundary area between BSs 1 and 2 connected to different network devices, all of network devices 1 and 2 overlappingly perform the process related to the call processing.

Accordingly, the present disclosure proposes a call processing method suitable for the IoT network capable of supporting mobility of the IoT terminal.

Figure 3:
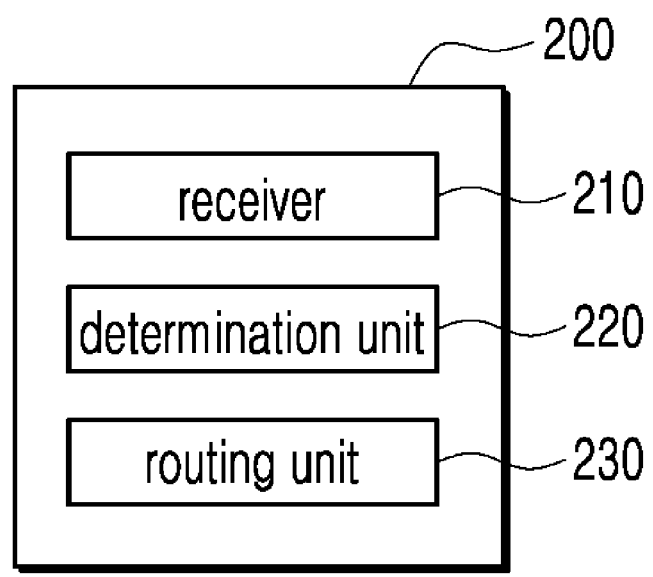
FIG. 3 is a block diagram illustrating the configuration of a network device according to an embodiment of the present disclosure.

The network device according to an embodiment of the present disclosure will be described in detail with reference to FIG. 3.

A network device 200 according to the present disclosure includes a receiver 210 configured to receive an uplink packet related to a specific terminal, which has moved from another network device, a determination unit 220 configured to determine a specific network device to which the uplink packet is routed on the basis of the uplink packet, and a routing unit 230 configured to route the uplink packet to the specific network device. The network device 200 is implemented by, or includes, one or more processors, which including electrical circuits or integrates circuits, and/or application-specific integrated circuits (ASICs). Other components of the network device 200, such as each of the receiver 210, the determination unit 220 and the routing unit 230 are implemented by, or includes, one or more processors, which including electrical circuits or integrates circuits, and/or application-specific integrated circuits (ASICs). The receiver 210 includes one or more network interfaces (e.g., communication modem chip(s) comprising application-specific integrated circuits (ASICs)) including, but not limited to, cellular, Wi-Fi, LAN, WAN, CDMA, WCDMA, GSM, LTE and EPC networks, and cloud computing networks. The network device 200 further comprises input units such as one or more buttons, a touch screen, a mic and so on, and output units such as a display, an indicator and so on (not shown).

At this time, the uplink packet related to the specific terminal may be an uplink message such as a join message or a normal report message transmitted from the specific terminal.

Figure 4:
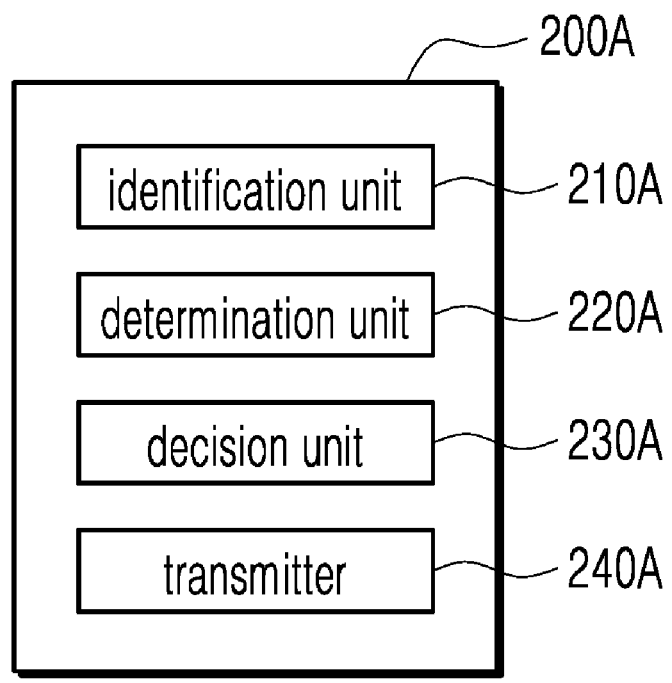
FIG. 4 is a block diagram illustrating the configuration of the network device according to a detailed embodiment of the present disclosure.

Alternatively, when an IoT BS receives the downlink packet transmitted from the network device 200 to be transmitted to the specific terminal and transmits the downlink packet to the specific terminal, the uplink packet related to the specific terminal may be a response packet (TxACK) transmitted to the network device 200 for downlink packet processing by an IoT BS, Hereinafter, the network device according to a detailed embodiment of the present disclosure will be described in detail with reference to FIG. 4.

A network device 200A according to the present disclosure includes an identification unit 210A configured to identify specific information of an uplink message received from a specific terminal, a determination unit 220A configured to determine whether the uplink message is routed on the basis of the identification result of the specific information, and a decision unit 230A configured to, when it is determined to route the uplink message, decide a specific network device to which the uplink message is routed on the basis of the specific information. The network device 200A is implemented by, or includes, one or more processors, which including electrical circuits or integrates circuits, and/or application-specific integrated circuits (ASICs). Other components of the network device 200, such as each of the identification unit 210A, the determination unit 220A and the decision unit 230A are implemented by, or includes, one or more processors, which including electrical circuits or integrates circuits, and/or application-specific integrated circuits (ASICs). The network device 200A further comprises input units such as one or more buttons, a touch screen, a mic and so on, and output units such as a display, an indicator and so on (not shown).

Further, the network device 200A according to the present disclosure may further include a transmitter 240A configured to transmit the uplink message to the specific network device. The transmitter 240A includes one or more network interfaces (e.g., communication modem chip(s) comprising application-specific integrated circuits (ASICs)) including, but not limited to, cellular, Wi-Fi, LAN, WAN, CDMA, WCDMA, GSM, LTE and EPC networks, and cloud computing networks.

The identification unit 210A identifies specific information of the uplink message received from the specific terminal.

The specific terminal may be any one of the terminals 1, 2, 3 . . . N illustrated in FIG. 1.

Specifically, the specific terminal is defined as a terminal that moves to another network device and transmits an uplink packet (an uplink message), where the another network is not the network device managing subscription-related information of the specific terminal among terminals 1, 2, 3 . . . N.

For example, when terminal 1 experiences a subscription/opening process in order to use the IoT service, network device 1 initially involved in the subscription/opening of terminal 1 manages subscription-related information of terminal 1.

At this time, a terminal identifier (hereinafter, referred to as a Device Extend Unique Identifier (DevEUI)) of terminal 1 and a network device identifier (hereinafter, referred to as a Network Server ID (NSID)) of network device 1 initially involved in subscription/opening of terminal 1 are mapped to each other. The terminal identifier (DevEUI) is determined in a format of 64 bits defined by IEEE.

That is, in order to support mobility of terminal 1, the terminal identifier (DevEUI) of terminal 1 and the network device identifier (NSID) of network device 1 are mapped to each other and stored in a mapping table when terminal 1 is subscribed to/open.

Further, in the present disclosure, mapping information stored in the mapping table is shared by all network devices 1, 2, 3 . . . M.

In such a situation, when terminal 1 moves to another network device 2, which is not network device 1 managing subscription-related information of terminal 1, and transmits the uplink message, terminal 1 is a specific terminal.

Hereinafter, for convenience of description, a detailed configuration of network device 2 configured to perform routing in order to support mobility of terminal 1 using network device 1 initially involved in subscription/opening of the specific terminal (terminal 1) will be described in detail.

That is, the network device 200A described below is network device 2.

The identification unit 210A receives an uplink packet, that is, an uplink message from terminal 1 and identifies specific information from the received uplink message.

The uplink message may be one of a join message, which terminal 1 transmits to make a request for joining in the network when power is first turned on, and a normal report message, which terminal 1 transmits to report data after the join procedure is completed.

The join message is transmitted to the network device by terminal 1 to make a request for joining when terminal 1 is first turned on, and includes a terminal identifier (DevEUI), an application identifier (application extend unique identifier), and a random value generated by terminal 1.

When receiving the join message from terminal 1, network device 2 performs the join procedure for terminal 1 and allocates a terminal address (hereinafter, referred to as a DevAddr) to terminal 1 so that terminal 1 can be distinguished from other terminals.

The normal report message, which terminal 1 transmits after the completion of the join procedure, includes the terminal address (DevAddr), which network device 2 allocates to terminal 1, instead of the terminal identifier (DevEUI).

The terminal address (DevAddr) is expressed in 32 bits and defined in a format shown in [Table 1] below.

TABLE 1

| Device Address (32 bits) | |
|---|---|
| NwkID (7 bits) (F1)<br>Division according to each nation or business after allocated | NwkAddr (25 bits) (F2)<br>NSID (5 bits)   IDs per NS (20 bits) |

That is, the terminal address (DevAddr) includes a field (F1) for indicating a network identifier (hereinafter, referred to as NwkID) for division according to each nation or business after allocated by network device 2 and a field (F2) for indicating a network address (hereinafter, referred to as NwkAddr).

At this time, the network device identifier (NSID) of network device 1 is allocated to upper 5 bits in the 25 bits of the network address (NwkAddr).

At this time, when network device 2 allocates the terminal address (DevAddr) to terminal 1, network device 2 may allocate the network device identifier (NSID) of network device 1 to upper 5 bits of the field (F2) within the network address (NwkAddr) since network device 2 shares and knows mapping information (the terminal identifier (DevEUI) of terminal 1—the network device identifier (NSID) of network device 1) stored in the mapping table.

Referring back to the identification unit 210A, when the uplink message received from terminal 1 is the join message, the identification unit 210A identifies the terminal identifier (DevEUI) included in the join message as specific information.

When the uplink message received from terminal 1 is the normal report message, the identification unit 210A identifies the terminal address (DevAddr) included in the normal report message as specific information.

The determination unit 220A determines whether to route the uplink message on the basis of the identification result of the specific information.

More specifically, when the uplink message is the join message, the determination unit 220A identifies the network device identifier (NSID) pre-allocated to the terminal identifier (DevEUI) on the basis of mapping information stored in the mapping table.

Further, the determination unit 220A determines whether to route the join message on the basis of a result of comparison between the network device identifier (NSID) pre-allocated to the terminal identifier (DevEUI) and its own network device identifier.

When the network device identifier (NSID) pre-allocated to the terminal identifier (DevEUI) and its own network device identifier match each other, the determination unit 220A processes the join message by itself without routing the join message.

When the network device identifier (NSID) pre-allocated to the terminal identifier (DevEUI) and its own network device identifier do not match each other, the determination unit 220A determines to route the join message.

Meanwhile, when the uplink message is the normal report message, the determination unit 220A determines whether to route the normal report message on the basis of a result of comparison between the network device identifier (NSID) pre-allocated to the terminal address (DevAddr) and its own network device identifier.

That is, when the network device identifier (NSID) pre-allocated to the terminal address (DevAddr) and its own network device identifier match each other, the determination unit 220A processes the normal report message by itself without routing the normal report message.

When the network device identifier (NSID) pre-allocated to the terminal address (DevAddr) and its own network device identifier do not match each other, the determination unit 220A determines to route the normal report message.

When it is determined to route the uplink message (the join message or the normal report message), the decision unit 230A determines a specific network device to which the uplink message is routed on the basis of specific information.

More specifically, when the uplink message is the join message, the decision unit 230A determines, as the specific network device, network device 1 having the network device identifier (NSID) pre-allocated to specific information, that is, the terminal identifier (DevEUI).

Meanwhile, when the uplink message is the normal report message, the decision unit 230A determines, as the specific network device, network device 1 having the network device identifier (NSID) pre-allocated to specific information, that is, the terminal address (DevAddr) of terminal 1.

In the above-described structure of the IoT network in FIG. 1, when the network device initially involved in subscription/opening of terminal 1 is network device 1, the specific network device determined on the basis of specific information of the uplink message (the join message or the normal report message) is network device 1.

When the specific network device to which the message is routed is determined, the transmitter 240A routes the join message to the specific network device if the uplink message is the join message and route the normal report message to the specific network device if the uplink message is the normal report message.

As a result, in the case in which terminal 1 moves to network device 2, which is not network device 1 initially involved in subscription/opening of terminal 1, and transmits the uplink message, if the uplink message is the join message, network device 2 identifies the terminal identifier (DevEUI) included in the join message as specific information, identifies the network device identifier (NSID) pre-allocated to the terminal identifier (DevEUI) through the mapping table, determines whether to route the join message and the specific network device, and routes the join message to the specific network device.

Meanwhile, in the case in which terminal 1 moves to network device 2, which is not network device 1 initially involved in subscription/opening of terminal 1, and transmits the uplink message, if the uplink message is the normal report message, network device 2 identifies the terminal address (DevAddr) included in the normal report message as specific information, identifies the network device identifier (NSID) pre-allocated to the terminal address (DevAddr), determines whether to route the normal report message and the specific network device, and routes the normal report message to the specific network device.

Meanwhile, it has been described that the routing function between network devices for supporting mobility of the IoT terminal is performed inside the network device 200A according to an embodiment of the present disclosure, but the present disclosure is not limited thereto.

That is, the routing function between network devices for supporting mobility of the IoT terminal according to the present disclosure may be implemented by a Mobility Management (MM) module, which is a separate independent entity located outside the network device 200A.

Hereinafter, a method of operating the network device according to an embodiment of the present disclosure will be described with reference to FIGS. 5 and 6.

Figure 5:
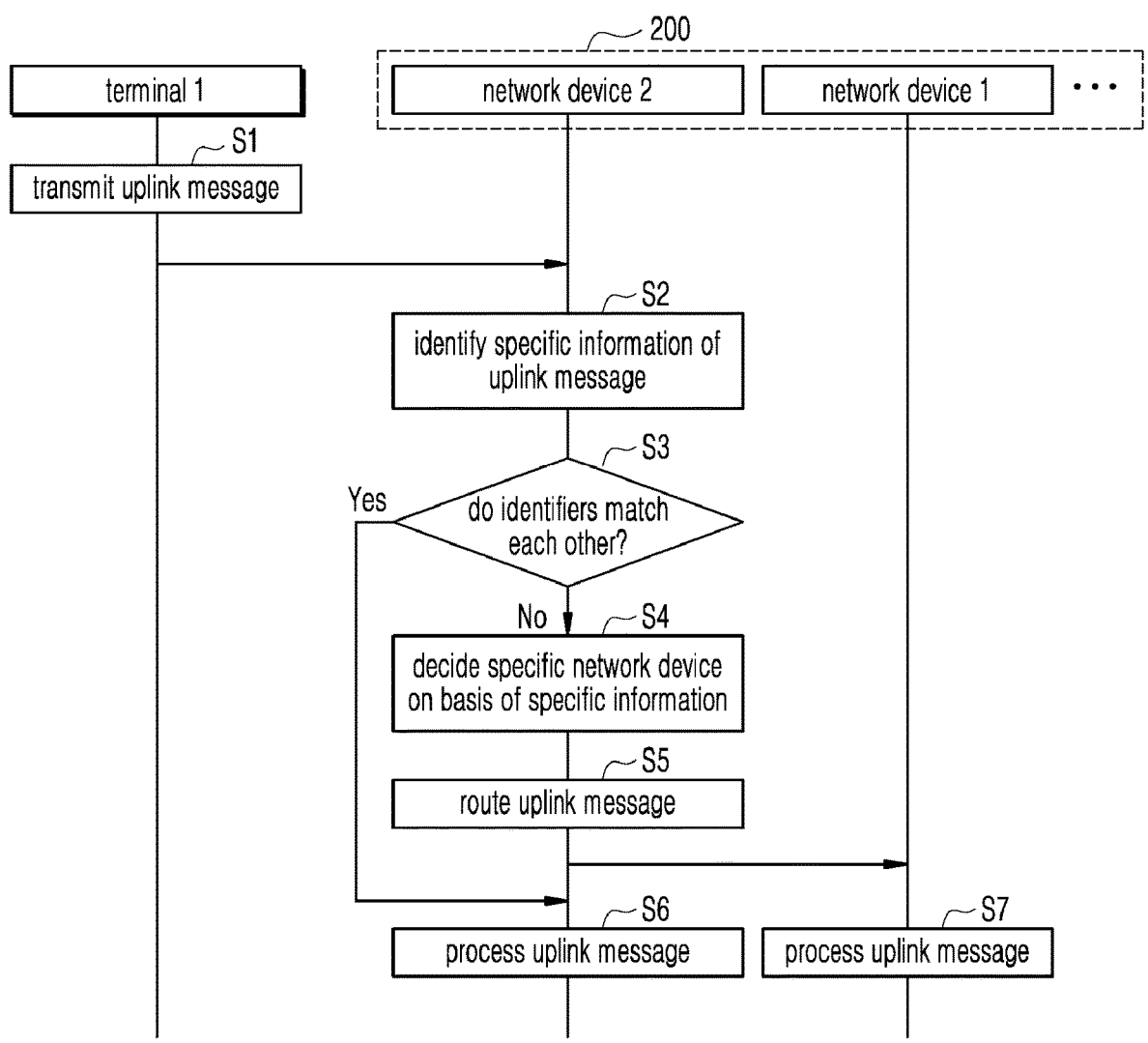
FIG. 5 is a flowchart illustrating a routing operation method between network devices according to an embodiment of the present disclosure.

FIG. 5 is a flowchart illustrating a routing operation method between network devices according to an embodiment of the present disclosure.

In FIG. 5, as described above, terminal 1 is the specific terminal, network device 1 is the network device initially involved in subscription/opening of terminal 1, and network device 2 is the network device that performs the routing operation on the basis of the uplink message received from terminal 1.

According to the present disclosure, terminal 1 transmits the uplink message in a broadcast scheme in S1.

At this time, when terminal 1 moves to a BS (not shown) of network device 2 and transmits the uplink message, network device 2 receives the uplink message from terminal 1.

According to the present disclosure, network device 2 identifies specific information from the uplink message received from terminal 1 in S2.

The uplink message may be one of a join message, which terminal 1 transmits to make a request for joining when power is first turned on, and a normal report message, which terminal 1 transmits to periodically report data after the join procedure is completed.

According to the present disclosure, when the uplink message received from terminal 1 is the join message, network device 2 identifies a terminal identifier (DevEUI) included in the join message as specific information.

Meanwhile, according to the present disclosure, when the uplink message received from terminal 1 is the normal report message, network device 2 identifies the terminal address (DevAddr) included in the normal report message as specific information.

According to the present disclosure, network device 2 identifies whether to route the uplink message on the basis of the identification result of the specific information in S3.

More specifically, network device 2 may identify a network device identifier (NSID) of the network device initially involved in subscription/opening of terminal 1 on the basis of the specific information identified from the uplink message.

That is, network device 2 may identify the network device identifier (NSID) pre-allocated to specific information, that is, the terminal identifier (DevEUI) in mapping information stored in the mapping table when the uplink message is the join message, and may identify the network device identifier (NSID) pre-allocated to the terminal address (DevAddr) when the uplink message is the normal report message.

Accordingly, network device 2 determines whether to perform routing by comparing the network device identifier (NSID), which is identified on the basis of the specific information identified from the uplink message, and its own network device identifier.

When the pre-allocated network device identifier (NSID) and its own network device identifier match each other on the basis of the comparison result in step S3, network device 2 processes the join message/normal report message by itself without routing the same in S6.

When the pre-allocated network device identifier (NSID) and its own network device identifier do not match each other on the basis of the comparison result in step S3, network device 2 determines to route the join message/normal report message.

Further, network device 2 determines a specific network device to which the uplink message is routed on the basis of the specific information of the uplink message in S4.

More specifically, when the uplink message is the join message, network device 2 determines, as the specific network device, network device 1 having the network device identifier (NSID) pre-allocated to the specific information, that is, the terminal identifier (DevEUI).

Meanwhile, when the uplink message is the normal report message, network device 2 determines, as the specific network device, network device 1 having the network device identifier (NSID) pre-allocated to the specific information, that is, the terminal address (DevAddr) of terminal 1.

In the above-described structure of the IoT network in FIG. 1, when the network device initially involved in subscription/opening of terminal 1 is network device 1, the specific network device determined on the basis of specific information of the uplink message (the join message or the normal report message) is network device 1.

When the specific network to which the message is routed is determined, network device 2 may route the uplink message (the join message or the normal report message) to network device 1, which has been determined as the specific network device, in S5.

At this time, after the specific network device to which the uplink message is routed is determined, network device 2 may additionally perform a process of identifying whether the determined specific network device, that is, network device 1, cannot accept a call.

That is, network device 2 may inquire the specific network device about whether to accept a call, and when the specific network device can accept the call, route the uplink message to the specific network device, that is, network device 1 in S5. Network device 1 may receive and process the uplink message of terminal 1 in S7.

However, network device 2 may inquire the specific network device about whether to accept a call, and when the specific network device cannot accept the call, drop the uplink message without routing the uplink message to the specific network device, that is, network device 1.

Figure 6:
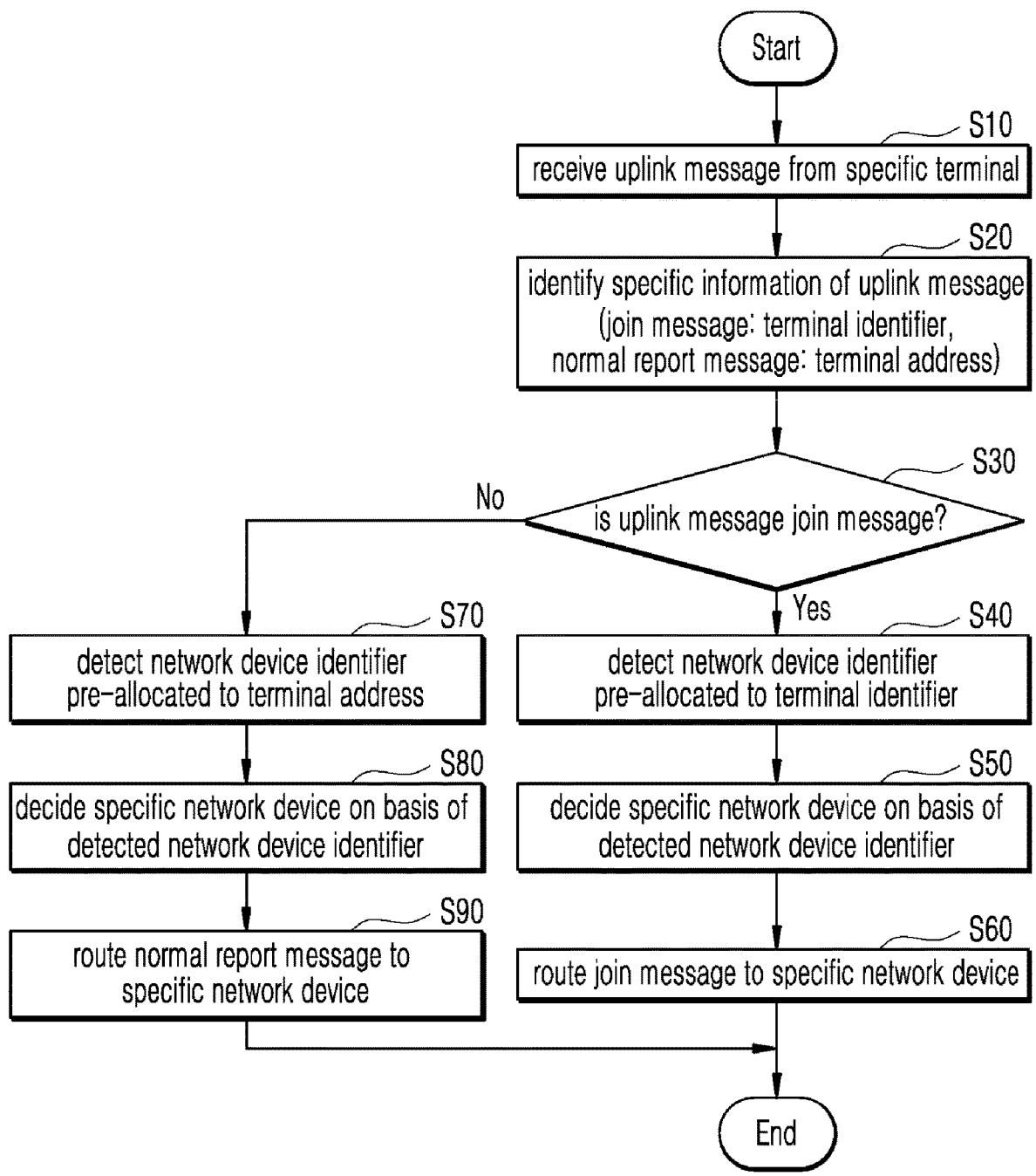
FIG. 6 is a flowchart illustrating a method of operating the network device according to an embodiment of the present disclosure.

FIG. 6 is a flowchart illustrating a method of operating the network device according to an embodiment of the present disclosure.

In FIG. 6 also, terminal 1 is the specific terminal, network device 1 is the network device initially involved in subscription/opening of terminal 1, and network device 2 is the network device that performs the routing operation on the basis of the uplink message received from terminal 1.

The identification unit 210A of network device 2 according to the present disclosure receives the uplink message from terminal 1 and identifies specific information from the received uplink message in S10 and S20.

The uplink message may be one of a join message, which terminal 1 transmits to make a request for joining when power is first turned on, and a normal report message, which terminal 1 transmits to periodically report data after the join procedure is completed.

That is, when the uplink message received from terminal 1 is the join message, the identification unit 210A identifies the terminal identifier (DevEUI) included in the join message as specific information.

Meanwhile, when the uplink message received from terminal 1 is the normal report message, the identification unit 210A identifies the terminal address (DevAddr) included in the normal report message as specific information.

When the specific information is identified from the uplink message, the determination unit 220A of network device 2 according to the present disclosure determines whether to route the uplink message on the basis of the identification result of the specific information.

More specifically, the determination unit 220A determines whether the uplink message is the join message in S30.

At this time, the determination of whether the uplink message is the join message is used as a reference for determining a transmission command to transmit the join message according to the communication standard in order to provide the IoT service and field value information defining a message type within the transmission command, or when an identifier for being distinguished from the normal report message is separately allocated, may be performed using the allocated identifier.

When the uplink message is the join message based on the determination result of step S30, the determination unit 220A detects the network device identifier (NSID) pre-allocated to the terminal identifier (DevEUI) within the join message on the basis of mapping stored in the mapping table in S40.

Thereafter, the determination unit 220A determines whether to route the join message on the basis of a result of comparison between the network device identifier (NSID) pre-allocated to the terminal identifier (DevEUI) and its own network device identifier.

That is, when the network device identifier (NSID) pre-allocated to the terminal identifier (DevEUI) and its own network device identifier match each other, the determination unit 220A determines to process the join message by itself without routing the join message.

On the other hand, when the network device identifier (NSID) pre-allocated to the terminal identifier (DevEUI) and its own network device identifier do not match each other, the determination unit 220A determines to route the join message.

When it is determined to route the join message, the decision unit 230A of network device 2 according to the present disclosure decides network device 1 having the network device identifier (NSID) pre-allocated to the terminal identifier (DevEUI) as a specific network device among the plurality of network devices 1, 2, 3, . . . M in S50.

The transmitter 240A of network device 2 according to the present disclosure routes the join message to network device 1, which is the specific network device, in S60.

Meanwhile, when the uplink message is not the join message based on the determination result of step S30, the determination unit 220A of network device 2 according to the present disclosure determines that the uplink message is the normal report message and detects the network device identifier (NSID) pre-allocated to the terminal address (DevAddr) within the normal report message in S70.

Thereafter, the determination unit 220A of network device 2 according to the present disclosure determines whether to route the normal report message on the basis of a result of comparison between the network device identifier (NSID) pre-allocated to the terminal address (DevAddr) and its own network device identifier.

That is, when the network device identifier (NSID) pre-allocated to the terminal address (DevAddr) and its own network device identifier match each other, the determination unit 220A determines to process the normal report message by itself without routing the normal report message.

On the other hand, when the network device identifier (NSID) pre-allocated to the terminal address (DevAddr) and its own network device identifier do not match each other, the determination unit 220A determines to route the normal report message.

When it is determined to route the normal report message, the decision unit 230A of network device 2 according to the present disclosure decides network device 1 having the network device identifier (NSID) pre-allocated to the terminal address (DevAddr) as a specific network device among the plurality of network devices 1, 2, 3, . . . M in S80.

The transmitter 240A of network device 2 according to the present disclosure routes the normal report message to network device 1, which is the specific network device, in S90.

As described above, according to the present disclosure, mobility of the terminal can be supported even in the structure of the current IoT network in which there is no server designated for managing subscription-related information of the terminal, and thus it is possible to be free from problems (①, ②, and ③ of FIG. 2) about failure in call processing, duplication of call processing, and overload due to simultaneous call access.

According to the present disclosure, an effect of improving the performance of the IoT service can be derived by proposing a routing method between network devices capable of making call processing suitable for the IoT network, which can support mobility of the terminal, possible.

According to another aspect of the structure of the IoT network, when the network device is to transmit the downlink packet to the IoT terminal, the network device transmits the downlink packet to one IoT gateway device (BS) preselected for the IoT terminal and the one BS receiving the downlink packet transmits the downlink packet to the IoT terminal.

In order to transmit the downlink packet by the IoT network device through such a method, call processing between the network device and the BS should be performed. For this, a Gateway Message Protocol (GWMP) is used as a call processing protocol in the structure of the IoT network.

Particularly, in the case of GWMP v2, when the downlink packet is received from the network device, the BS generates a response packet (TxACK) including error state information on processing of the downlink packet of the BS and transmits the response packet to the network device, which improves completeness of transmission of the downlink packet.

The error state information includes codes for indicating normal processing, downlink packet collision, too late, and too early as shown in [Table 2] below.

TABLE 2

| Text | Description |
| --- | --- |
| TOO_LATE | Rejected because it was already too late to program this packet for downlink |
| TOO_EARLY | Rejected because downlink packet timestemp was received by the gateway too long before the scheduled transmission time |
| COLLISION_PACKET | Rejected because there was already a packet programmed in requested timeframe |
| COLLISION_BEACON | Rejected because there was already a beacon planned in requested timeframe |
| TX_FREQ | Rejected because requested frequency is not supported by TX RF chain |
| TX_POWER | Rejected because requested power is not supported by gateway |
| GPS_UNLOCKED | Rejected because GPS is unlocked, so GPS timestamp cannot be used |

The response packet (TxACK) includes a token as an identifier for identifying the response packet (TxACK), where the token is information mapped between the network device and the BS in one-to-one correspondence.

That is, the network device transmitting the downlink packet allocates the token to identify the response packet (TxACK) but, at this time, another network device within the IoT network may allocate the same token to identify the response packet (TxACK).

As described above, even though different network devices allocate the same (duplicated) token, it is not a major problem in the IoT network environment in which mobility of the IoT terminal is not supported since call processing inevitably fails anyway.

However, in the IoT network environment in which mobility of the IoT terminal is supported according to the present disclosure, a problem may occur in that a network device, to which the response packet (TxACK) is routed, cannot be recognized due to the duplicated token allocated by different network devices.

Accordingly, the present disclosure proposes a method of routing the response packet (TACK) between network devices suitable for the IoT network environment in which mobility of the IoT terminal is supported.

Figure 7:
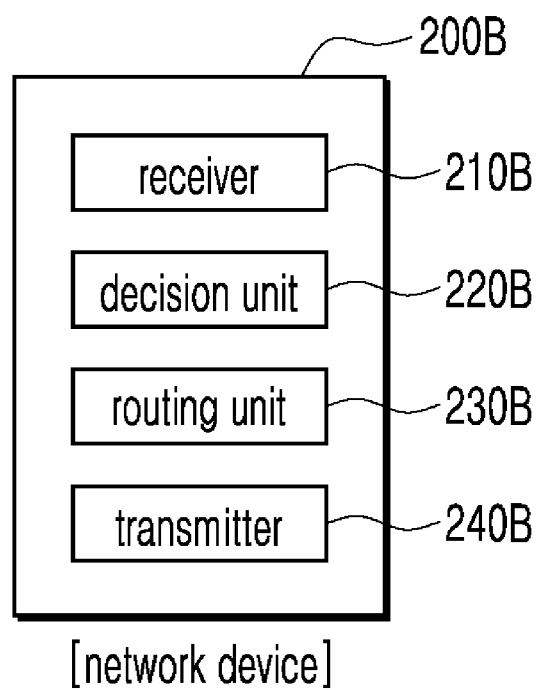
FIG. 7 is a block diagram illustrating the configuration of the network device according to another embodiment of the present disclosure.

Hereinafter, the network device according to an embodiment of the present disclosure will be described in detail with reference to FIG. 7.

A network device 200B according to the present disclosure includes a receiver 210B configured to receive a response packet of a specific downlink packet transmitted to the terminal, a decision unit 220B configured to decide a specific network device allocated to the terminal on the basis of on an analysis result of the response packet, and a routing unit 230B configured to route the response packet to the specific network device. The network device 200B is implemented by, or includes, one or more processors, which including electrical circuits or integrates circuits, and/or application-specific integrated circuits (ASICs). Other components of the network device 200B, such as each of the receiver 210B, the decision unit 220B, the routing unit 230B are implemented by, or includes, one or more processors, which including electrical circuits or integrates circuits, and/or application-specific integrated circuits (ASICs). The receiver 210B includes one or more network interfaces (e.g., communication modem chip(s) comprising application-specific integrated circuits (ASICs)) including, but not limited to, cellular, Wi-Fi, LAN, WAN, CDMA, WCDMA, GSM, LTE and EPC networks, and cloud computing networks. The network device 200B further comprises input units such as one or more buttons, a touch screen, a mic and so on, and output units such as a display, an indicator and so on (not shown).

Further, the network device 200B according to the present disclosure may further include a transmitter 240B configured to transmit the specific downlink packet and the response packet.

The specific downlink packet is a downlink packet which another network device transmits to a terminal (hereinafter, a specific terminal) moving to the another network device, where the another network is not the network device managing subscription-related information of the terminal among the terminals 1, 2, 3 . . . N illustrated in FIG. 1.

Hereinafter, for convenience of description, it is assumed that terminal 2 among terminals 1, 2, 3 . . . N illustrated in FIG. 1 is described as the specific terminal and terminal 2 moves from network device 2 (network device 2 to which terminal 2 is allocated (which accommodates terminal 2)) managing subscription-related information of terminal 2 to another network device, that is, network device 1.

The specific downlink packet which network device 2 is to transmit to terminal 2 includes a token allocated by network device 2 to identify the response packet (TxACK) of the specific downlink packet.

The token is mapped between network device 2 and BS 2 connected thereto in one-to-one correspondence. Accordingly, when BS 2 receives the specific downlink packet including the token, BS 2 generates a response packet (TxACK) including a token, which is the same as the token included in the specific downlink packet, and transfers the response packet (TxACK) to the network device 200B.

For example, when a specific downlink packet including a token (for example, AAAAA1) is received from network device 2, BS 2 generates a response packet (TxACK) including a token, which is the same as the token (for example, AAAAA1) included in the specific downlink packet, and transfers the response packet (TxACK) to network device 2.

The response packet (TxACK) includes a version-related field 300 for storing a protocol version, a token-related field 310 for storing a token, an identifier-related field 320 for storing a response packet identifier (TxACK ID), and an information indicating field 330 for storing payload as shown in [Table 3] below.

TABLE 3

| Protocol Version | Token (4 bytes) | TxACK ID | Payload (indicating Error information) |
|---|---|---|---|

Meanwhile, the network device 200B according to an embodiment of the present disclosure is network device 1 to which terminal 2 moves in the assumed situation (in which terminal 2 moves from network device 2 to network device 1).

Accordingly, hereinafter, it is understood that the network device 200B according to the present disclosure is network device 1.

The receiver 210B receives the response packet of the specific downlink packet.

Specifically, when the transmitter 240B transmits the specific downlink packet to BS 1, the receiver 210B receives the response packet (TxACK) of the specific downlink packet from BS 1.

Figure 8:
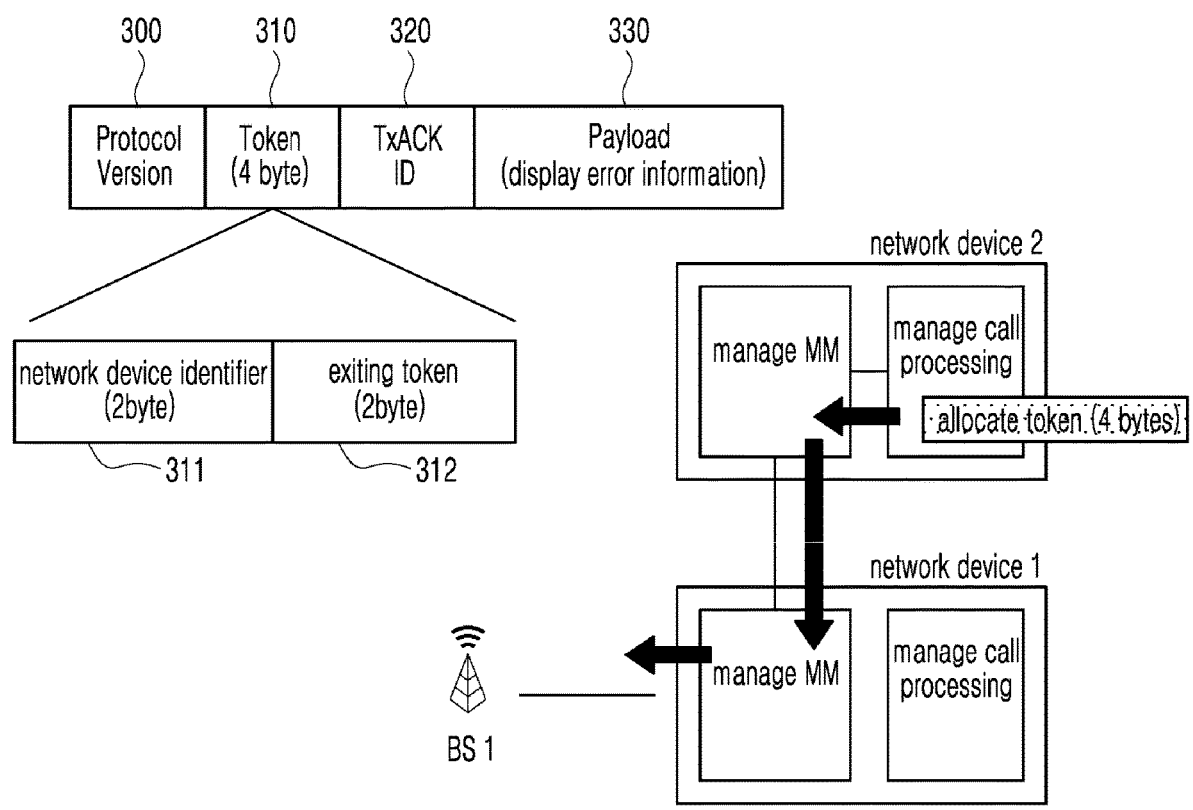
FIG. 8 illustrates a first method of allocating a token according to another embodiment of the present disclosure.

In connection with this, FIG. 8 illustrates a first method of allocating a token in order to implement routing of the response packet (TxACK) according to the present disclosure.

As illustrated in FIG. 8, network device 2 to which terminal 2 is allocated (which accommodates terminal 2) allocates a token to identify the response packet (TxACK) of the specific downlink packet.

Hereinafter, the first method will be described of allocating the token through the response packet (TxACK) based on the fact that the token is allocated by network device 2 and then transmitted to network device 1 with being inserted into the specific downlink packet, and the response packet (TxACK) therefore includes the same token as that of the specific downlink packet.

Network device 2 newly defines the size of the token-related field 310 within the response packet (TxACK) from 2 bytes to 4 bytes.

The newly defined token-related field 310 includes a first area 311 having the size of 2 bytes for storing a network device identifier to which the response packet (TxACK) is routed and a second area 312 having the size of 2 bytes for storing the existing token.

That is, network device 2 generates the specific downlink packet including its own network device identifier in the first area 311 and transmits the specific downlink packet to network device 1.

Then, network device 1 transmits, through the transmitter 240B, the specific downlink packet including the network device identifier of network device 2 to BS 1 connected to network device 1.

The receiver 210B receives the response packet (TxACK) of the specific downlink packet from BS 1.

The decision unit 220B decides the specific network device on the basis of an analysis result of the response packet (TxACK).

More specifically, when the response packet (TxACK) is received, the decision unit 220B detects the network device identifier included in the token-related field 310 within the response packet (TxACK).

That is, since the network device identifier to which the response packet (TxACK) is routed is stored in the first area 311 of the token-related field 310, the decision unit 220B detects the network device identifier from the first area 311.

Thereafter, the decision unit 220B decides a network device having the detected network device identifier as the specific network device to which the response packet (TxACK) is routed.

That is, the decision unit 220B decides, as the specific network device, network device 2, which is a network device that matches the detected network device identifier among the plurality of network devices 1, 2, 3 . . . M illustrated in FIG. 1.

The routing unit 230B routes the response packet (TxACK) to the specific network device.

That is, when network device 2 is determined as the specific network device, the routing unit 230B routes the response packet (TxACK) to network device 2 for call processing of the response packet (TxACK).

Hereinafter, a flow of the operation in which the network device routes the response packet (TxACK) according to an embodiment of the present disclosure will be described in more detail with reference to FIG. 9.

Hereinafter, it is assumed that terminal 2 moves from network device 2 (network device 2 to which terminal 2 is allocated (which accommodates terminal 2)) managing subscription-related information of terminal 2 to another network device, that is, network device 1.

Figure 9:
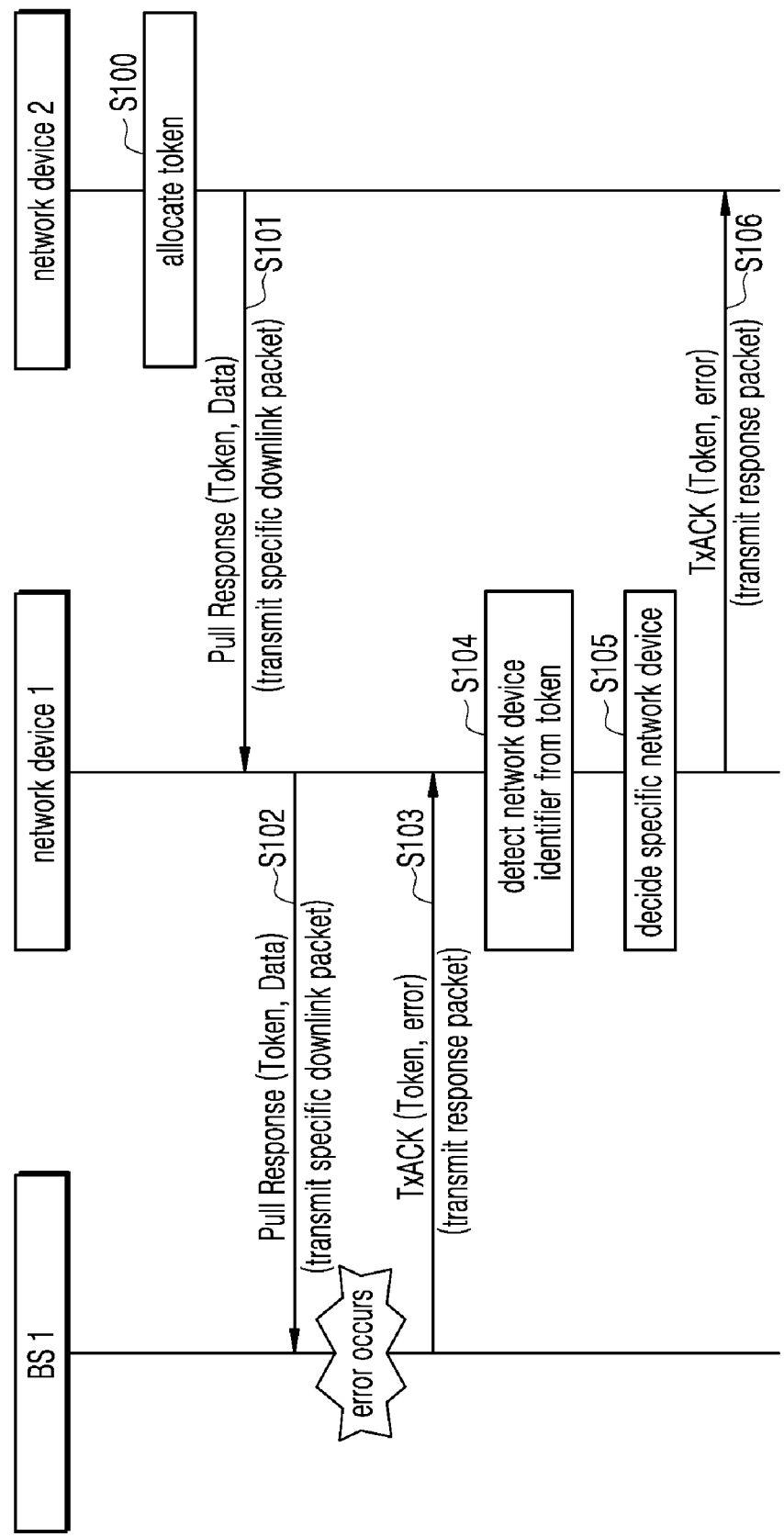
FIG. 9 is a flowchart illustrating the operation in which the network device routes a response packet (TxACK) according to another embodiment of the present disclosure.

As illustrated in FIG. 9, when terminal 2 allocated to (accommodated by) network device 2 moves to coverage of BS 1 connected to network device 1, network device 2 allocates a token for identifying a response packet (TxACK) in order to transmit a specific downlink packet to terminal 2 in S100.

Specifically, network device 2 newly defines the size of the token-related field 310 within the response packet (TxACK) from 2 bytes to 4 bytes.

The newly defined token-related field 310 includes a first area 311 having the size of 2 bytes for storing a network device identifier to which the response packet (TxACK) is routed and a second area 312 having the size of 2 bytes for storing the existing token.

Network device 2 may generate the specific downlink packet including its own network device identifier in the first area 311 and transmit the specific downlink packet to network device 1 in S101. The specific downlink packet is transmitted in the form of a message such as "Pull Response (token, Data)".

When the specific downlink packet is received from network device 2, network device 1 transmits the specific downlink packet to BS 1 connected to network device 1 to transmit the specific downlink packet to terminal 2 in S102.

Then, BS 1 identifies error state information detected during a processing process in which BS 1 receives the specific downlink packet from network device 1 and transmits the same to terminal 2.

Thereafter, BS 1 detects the token from the specific downlink packet, generates the response packet (TxACK) including the detected token and the error state information, and transmits the response packet (TxACK) to network device 1 in S103.

For example, when an error is generated during the processing process in which BS 1 receives the specific downlink packet and transmits the same to terminal 2, BS 1 detects the token from the specific downlink packet, identifies a code corresponding to the error in [Table 3], that is, error state information, generates the response packet (Tx-ACK), and transmits the response packet (TxACK) to network device 1.

Then, network device 1 detects the network device identifier included in the token-related field 310 within the response packet (TxACK) in S104.

That is, since the network device identifier to which the response packet (TxACK) is routed is stored in the first area 311 of the token-related field 310, network device 1 may detect the network device identifier from the first area 311.

Thereafter, network device 1 determines a network device having the detected network device identifier as the specific network device in S105.

That is, network device 1 determines, as the specific network device to which the response packet (TxACK) is routed, network device 2, which is a network device that matches the detected network device identifier among the plurality of network devices 1, 2, 3 . . . M illustrated in FIG. 1.

Network device 1 routes the response packet (TxACK) to the specific network device, that is, network device 2 in S106.

According to the first method, the existing problem of routing of the response packet (TxACK) that cannot be performed as allocation of the duplicated tokens by all network devices can be resolved. But there is still a limitation in that a Message Protocol (GWMP), which is the standard protocol Gateway, used for call processing between the network device and the BS should be changed.

Accordingly, hereinafter, it will be described that a network device and a method by which the network device implements routing of the response packet (TACK) according to another embodiment of the present disclosure can implement routing of the response packet (TACK) without changing the standard protocol.

Figure 10:
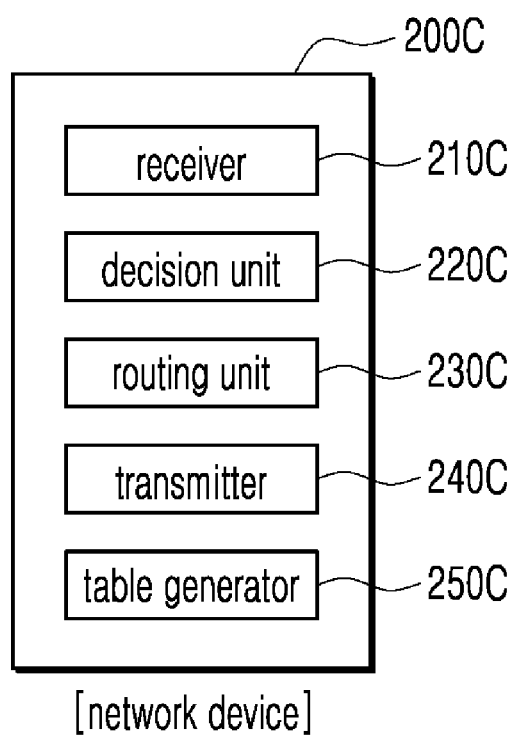
FIG. 10 is a block diagram illustrating the configuration of the network device according to another embodiment of the present disclosure.

FIG. 10 is a block diagram illustrating the configuration of the network device according to another embodiment of the present disclosure.

A network device 200C according to the present disclosure includes a receiver 210C configured to receive a response packet of a specific downlink packet transmitted to the terminal, a decision unit 220C configured to decide a specific network device allocated to the terminal on the basis of an analysis result of the response packet, and a routing unit 230C configured to route the response packet to the specific network device.

Further, the network device 200C according to the present disclosure may further include a transmitter 240C configured to transmit a specific downlink packet and the response packet and a table generator 250C configured to, when the downlink packet including a second token value is received from the specific network device, generate a token table by allocating a first token value different from the second token value.

Hereinafter, it is assumed that terminal 2 moves from network device 2 (network device 2 to which terminal 2 is allocated (which accommodates terminal 2)) managing subscription-related information of terminal 2 to another network device, that is, network device 1.

The receiver 210C receives the response packet of the specific downlink packet.

More specifically, when the transmitter 240C transmits the specific downlink packet to BS 1, the receiver 210C receives the response packet (TxACK) of the specific downlink packet from BS 1.

Figure 11:
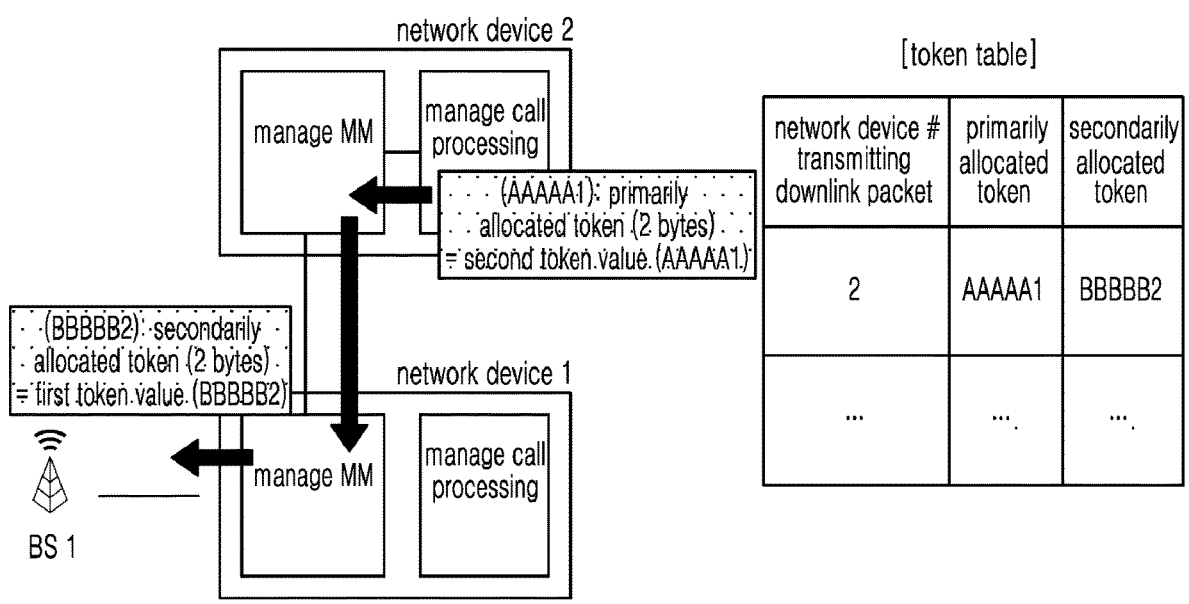
FIG. 11 illustrates a second method of allocating a token according to another embodiment of the present disclosure.

In connection with this, FIG. 11 illustrates a second method of allocating a token in order to implement routing of the response packet (TxACK) according to the present disclosure.

As illustrated in FIG. 11, network device 2 to which terminal 2 is allocated (which accommodates terminal 2) primarily allocates a token to identify the response packet (TxACK) of the specific downlink packet.

At this time, the token value (second token value) primarily allocated by network device 2 is allocated with the size of 2 bytes defined by the Gateway Message Protocol (GWMP), which is the standard protocol used for call processing between the network device and the BS.

That is, network device 2 allocates the second token value (for example, AAAAA1) in order to identify the response packet (TxACK), generates specific downlink packet 1 including the allocated second token value (for example, AAAAA1), and transfers specific downlink packet 1 to network device 1.

Specific downlink packet 1 is transmitted in the form of a message such as "Pull Response (primarily allocated token=second token value, Data)".

When specific downlink packet 1 is received from network device 2, network device 1 detects the second token value (for example, AAAAA1) from the specific downlink packet and secondarily allocates a non-duplicated token, which is different from the second token value (for example, AAAAA1).

That is, network device 1 secondarily allocates a non-duplicated token value (first token value) (for example, BBBBB2) which is different from the second token value (for example, AAAAA1) detected from the specific downlink packet.

Thereafter, network device 1 maps the primarily allocated token value (second token value) (for example, AAAAA1) and the secondarily allocated token value (first token value) (for example, BBBBB2) and generates a token table for routing the response packet (TxACK).

When the token table is completely generated, network device 1 generates specific downlink packet 2 by performing a replacement process such that the first token value (for example, BBBBB2) which network device 1 secondarily allocates is included in specific downlink packet 1 instead of the second token value (for example, AAAAA1) which network device 2 primarily allocates.

Specific downlink packet 2 is transmitted in the form of a message such as "Pull Response (secondarily allocated token=first token value, Data)".

That is, network device 1 generates specific downlink packet 2 including the first token value (for example, BBBBB2) which network device 1 secondarily allocates to identify the response packet (TxACK) and transmits specific downlink packet 2 to BS 1.

The receiver 210C receives response packet 1 (TxACK) of specific downlink packet 2 from BS 1. Response packet 1 (TxACK) is transmitted in the form of a message such as "TxACK (secondarily allocated token=first token value, error)".

The decision unit 220C decides the specific network device on the basis of an analysis result of response packet 1 (TxACK).

More specifically, when response packet 1 (TxACK) is received, the decision unit 220C detects the first token value (for example, BBBBB2) included in the token-related field 310 within response packet 1 (TxACK).

That is, the decision unit 220C detects the second token value (for example, AAAA1) mapped to the first token value (for example, BBBBB2) through a pre-stored token table and identifies that the detected second token value (for example, AAAAA1) is allocated by network device 2.

Thereafter, the decision unit 220C decides network device 2 allocating the second token value (for example, AAAAA1) as a specific network device to which response packet 1 (TxACK) is routed.

In this case, the decision unit 220C generates response packet 2 (TxACK) by performing a replacement process such that the second token value (for example, AAAAA1), which network device 2 primarily allocates, is included in response packet 1 (TxACK) instead of the first token value (for example, BBBBB2), which network device 1 secondarily allocates, included in the token-related field 310 within response packet 1 (TxACK). Response packet 2 (TxACK) is transmitted in the form of a message such as "TxACK (primarily allocated token=second token value, error)".

The routing unit 230C routes response packet 2 (TxACK) to the specific network device, that is, network device 2.

Hereinafter, a flow of the operation in which the network device routes the response packet (TxACK) according to an embodiment of the present disclosure will be described in more detail with reference to FIG. 12.

Hereinafter, it is assumed that terminal 2 moves from network device 2 (network device 2 to which terminal 2 is allocated (which accommodates terminal 2)) managing subscription-related information of terminal 2 to another network device, that is, network device 1.

As illustrated in FIG. 12, when terminal 2 allocated to (accommodated by) network device 2 moves to coverage of BS 1 connected to network device 1, network device 2 primarily allocates a token for identifying a response packet (TxACK) in order to transmit specific downlink packet 1 to terminal 2 in S200.

That is, network device 2 allocates the second token value (for example, AAAAA1) in order to identify the response packet (TxACK), generates specific downlink packet 1 including the allocated second token value (for example, AAAAA1), and transfers specific downlink packet 1 to network device 1 in S201.

Specific downlink packet 1 is transmitted in the form of a message such as "Pull Response (primarily allocated token=second token value, Data)".

When specific downlink packet 1 is received from network device 2, network device 1 detects the second token value (for example, AAAAA1) from specific downlink packet 1 and secondarily allocates a non-duplicated token, which is different from the second token value (for example, AAAAA1) in S202.

That is, network device 1 secondarily allocates a non-duplicated token value (first token value) (for example, BBBBB2) which is different from the second token value (for example, AAAAA1) detected from specific downlink packet 1.

Thereafter, network device 1 maps the primarily allocated token value (second token value) (for example, AAAAA1) and the secondarily allocated token value (first token value) (for example, BBBBB2) and generates a token table for routing the response packet (TxAKC) in S203.

When the token table is completely generated, network device 1 generates specific downlink packet 2 by performing a replacement process such that the first token value (for example, BBBBB2) which network device 1 secondarily allocates is included in specific downlink packet 1 instead of the second token value (for example, AAAAA1) which network device 2 primarily allocates in S204.

That is, network device 1 generates specific downlink packet 2 including the first token value (for example, BBBBB2) which network device 1 secondarily allocates to identify the response packet (TxACK) and transmits specific downlink packet 2 to BS 1 in S205.

Then, BS 1 identifies error state information detected during a processing process in which BS 1 receives specific downlink packet 2 from network device 1 and transmits the same to terminal 2.

Thereafter, BS 1 detects the secondarily allocated first token value (for example, BBBBB2) from specific downlink packet 2, generates response packet 1 (TxACK) including the detected first token value (for example, BBBBB2) and the error state information, and transmits response packet 1 (TxACK) to network device 1 in S206.

Response packet 1 (TxACK) is transmitted in the form of a message such as "TxACK (secondarily allocated token=first token value, error)".

Then, network device 1 detects the first token value (for example, BBBBB2) included in the token-related field 310 within response packet 1 (TxACK) in S207.

Thereafter, network device 1 may detect the second token value (for example, AAAA1) mapped to the first token value (for example, BBBBB2) through the pre-stored token table and identify that the detected second token value (for example, AAAAA1) is allocated by network device 2.

That is, network device 1 determines network device 2 allocating the second token value (for example, AAAAA1) as a specific network device to which response packet 1 (TxACK) is routed in S208.

Network device 1 generates response packet 2 (TxACK) by performing a replacement process such that the second token value (for example, AAAAA1), which network device 2 primarily allocates, is included in response packet 1 (TxACK) instead of the first token value (for example, BBBBB2), which network device 1 secondarily allocates, included in the token-related field 310 within response packet 1 (TxACK). Response packet 2 (TxACK) is transmitted in the form of a message such as "TxACK (primarily allocated token=second token value, error)".

Thereafter, network device 1 routes response packet 2 (TxACK) to the specific network device, that is, network device 2 in S209.

As a result, according to exemplary various embodiments of the present disclosure, even when the IoT terminal moves to coverage of another network in the IoT network environment, the network device to which the IoT terminal is allocated (which accommodates the IoT terminal) can be determined as the network device to which the response packet (TxACK) of the downlink packet is routed on the basis of the analysis result of the response packet (TxACK) and thus the response packet (TxACK) can be routed to the determined network device.

Accordingly, the present disclosure can provide a differentiated service quality by improving completeness of transmission of a message through the response packet (TxACK) in the IoT network environment in which mobility of the IoT terminal is supported.

As described above, according to exemplary various embodiments of the present disclosure, the present application obtains advantageous effects to derive an effect of improving performance of the IoT service by proposing a method of routing the response packet (TxACK) between network devices suitable for the IoT network environment in which mobility of the IoT terminal is supported.

As described above, according to exemplary various embodiments of the present disclosure, the present application obtains advantageous effects to derive an effect of improving performance of the IoT service by implementing a method of processing a call (an uplink message or a response packet) suitable for the IoT network in which mobility of the IoT terminal is supported.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A non-transitory computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers, including electrical circuits or integrated circuits, that are located at one site or distributed across a plurality of sites and interconnected by a communication network.

A non-transitory computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of the claimed invention or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A network device in a network system including a plurality of network devices, the network device comprising:
   an identification unit, implemented by a processor and including electrical circuits or integrated circuits, configured to identify whether specific information is included in an uplink message received from a specific terminal device, wherein the specific information includes subscription-related information indicating that (i) the specific terminal device has a subscription to a specific network device among the plurality of network devices and (ii) the specific terminal device is locally managed by the specific network device;
   a determination unit, implemented by a processor and including electrical circuits or integrated circuits, configured to determine whether to route the uplink message on the basis of the identification of the specific information; and
   a decision unit, implemented by a processor including electrical circuits or integrated circuits, configured to decide the specific network device to which the uplink message is routed on the basis of the specific information when routing the uplink message is determined,
   wherein each network device of the network devices in the network system locally manages terminal devices which subscribes to each network device.

2. The network device of claim 1, wherein, when the uplink message is a join message for joining of the specific terminal device in network, the specific information is a terminal identifier included in the join message.

3. The network device of claim 1, wherein, when the uplink message is a normal report message for report of the specific terminal device to network, the specific information is a terminal address included in the normal report message.

4. The network device of claim 1, wherein, when it is identified that the specific network device cannot accept a call, the network device drops the uplink message.

5. A method of operating a network device in a network system including a plurality of network devices, the method comprising:
   identifying whether specific information is included in an uplink message received from a specific terminal device, wherein the specific information includes subscription-related information indicating that (i) the specific terminal device has a subscription to a specific network device among the plurality of network devices and (ii) the specific terminal device is locally managed by the specific network device;
   determining whether to route the uplink message on the basis of the identification of the specific information; and
   deciding the specific network device to which the uplink message is routed on the basis of the specific information when routing the uplink message is determined,
   wherein each network device of the network devices in the network system locally manages terminal devices which subscribes to each network device.

6. The method of claim 5, wherein, when the uplink message is a join message for joining of the specific terminal device in network, the specific information is a terminal identifier included in the join message.

7. The method of claim 5, wherein, when the uplink message is a normal report message for report of the specific terminal device to network, the specific information is a terminal address included in the normal report message.

8. A network device in a network system including a plurality of network devices, the network device comprising:
   a receiver, implemented by a processor and including electrical circuits or integrated circuits, configured to receive a response packet of a specific downlink packet transmitted to a terminal device;
   a decision unit, implemented by a processor and including electrical circuits or integrated circuits, configured to analyze whether the response packet indicates the specific downlink packet is generated by a specific network device among the plurality of network devices in the network system; and
   a routing unit, implemented by a processor and including electrical circuits or integrated circuits, configured to route the response packet to the specific network device when the specific network device is a network device other than the network device receiving the response packet.

9. The network device of claim 8, wherein the decision unit is configured to detect a network device identifier included in a token-related field within the response packet and decide a network device having the detected network device identifier as the specific network device.

10. The network device of claim 8, wherein the decision unit is configured to detect a second token value mapped to a first token value of the token-related field within the response packet through a pre-stored token table and decide a network device allocating the second token value as the specific network device.

11. The network device of claim 10, further comprising a table generator configured to, when a downlink packet including the second token value is received from the specific network device, generate the token table by allocating the first token value different from the second token value.

12. A method of operating a network device in a network system including a plurality of network devices, the method comprising:
   receiving a response packet of a specific downlink packet transmitted to a terminal device;
   analyzing whether the response packet indicates the specific downlink packet is generated by a specific network device among the plurality of network devices in the network system; and
   routing the response packet to the specific network device when the specific network device is a network device other than the network device receiving the response packet.

13. The method of claim 12, wherein the deciding comprises detecting a network device identifier included in a token-related field within the response packet and deciding a network device having the detected network device identifier as the specific network device.

14. The method of claim 12, wherein the deciding comprises detecting a second token value mapped to a first token value of the token-related field within the response packet through a pre-stored token table and deciding a network device allocating the second token value as the specific network device.

15. The method of claim 14, further comprising, generating the token table by allocating the first token value different from the second token value when a downlink packet including the second token value is received from the specific network device.

* * * * *